UNITED STATES PATENT OFFICE.

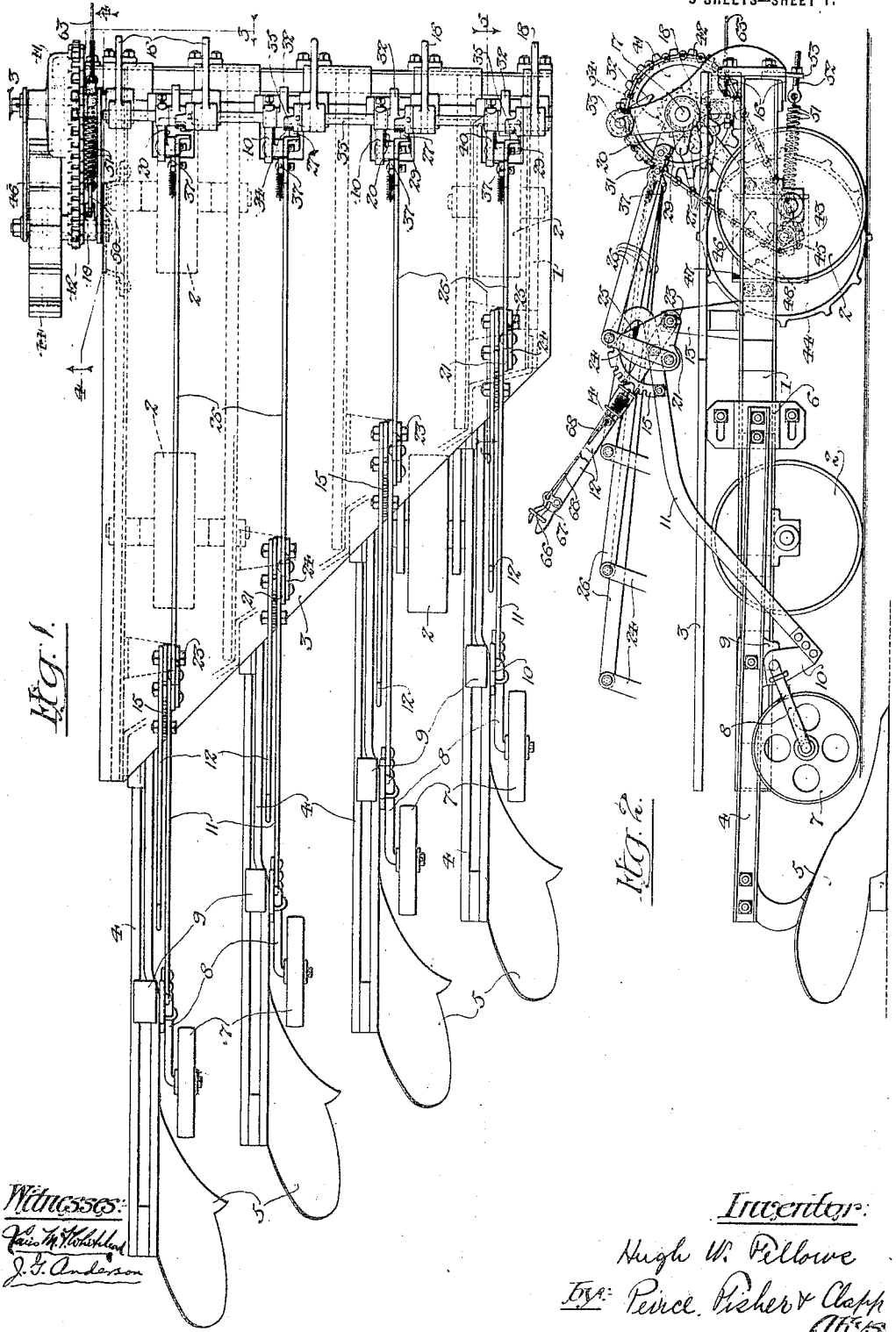

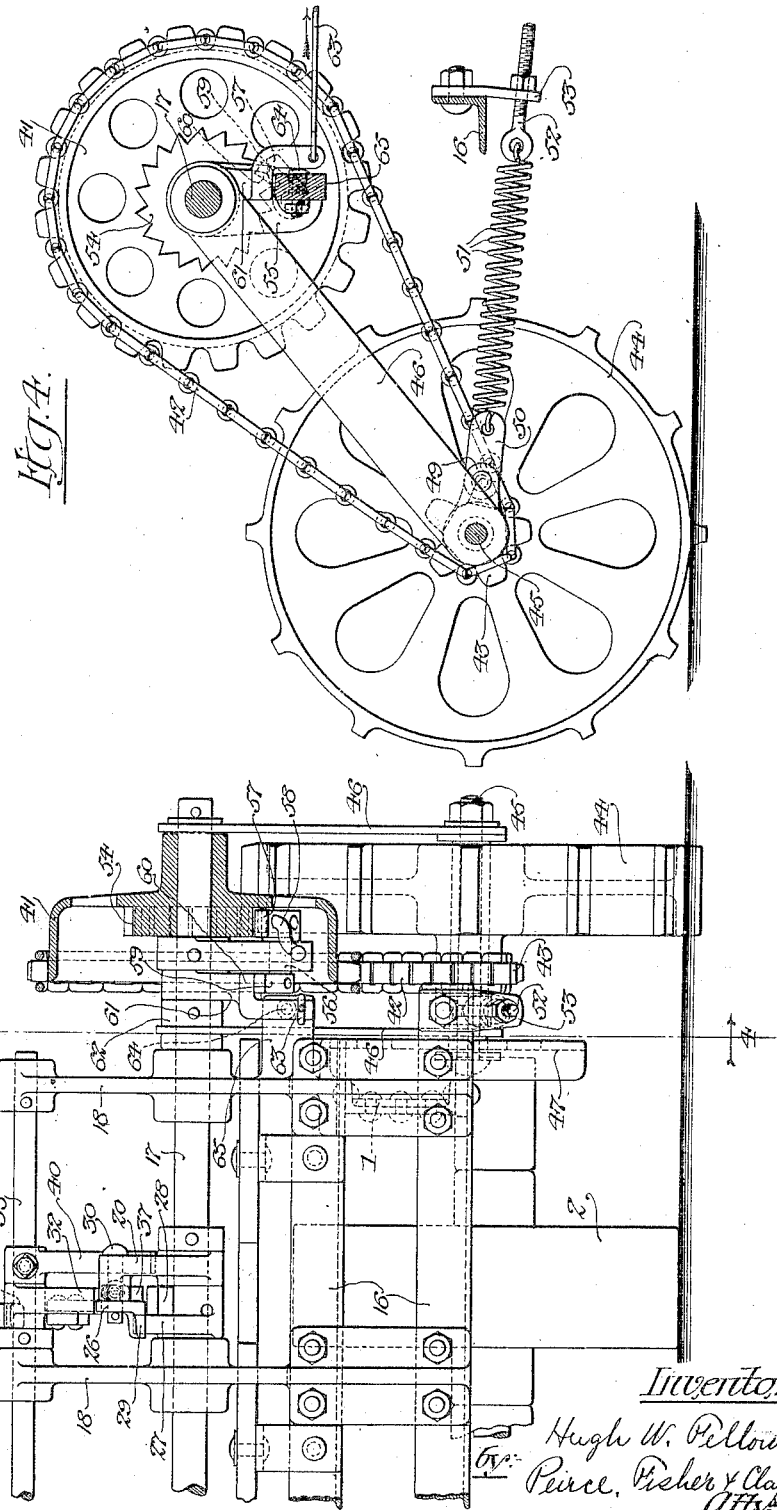

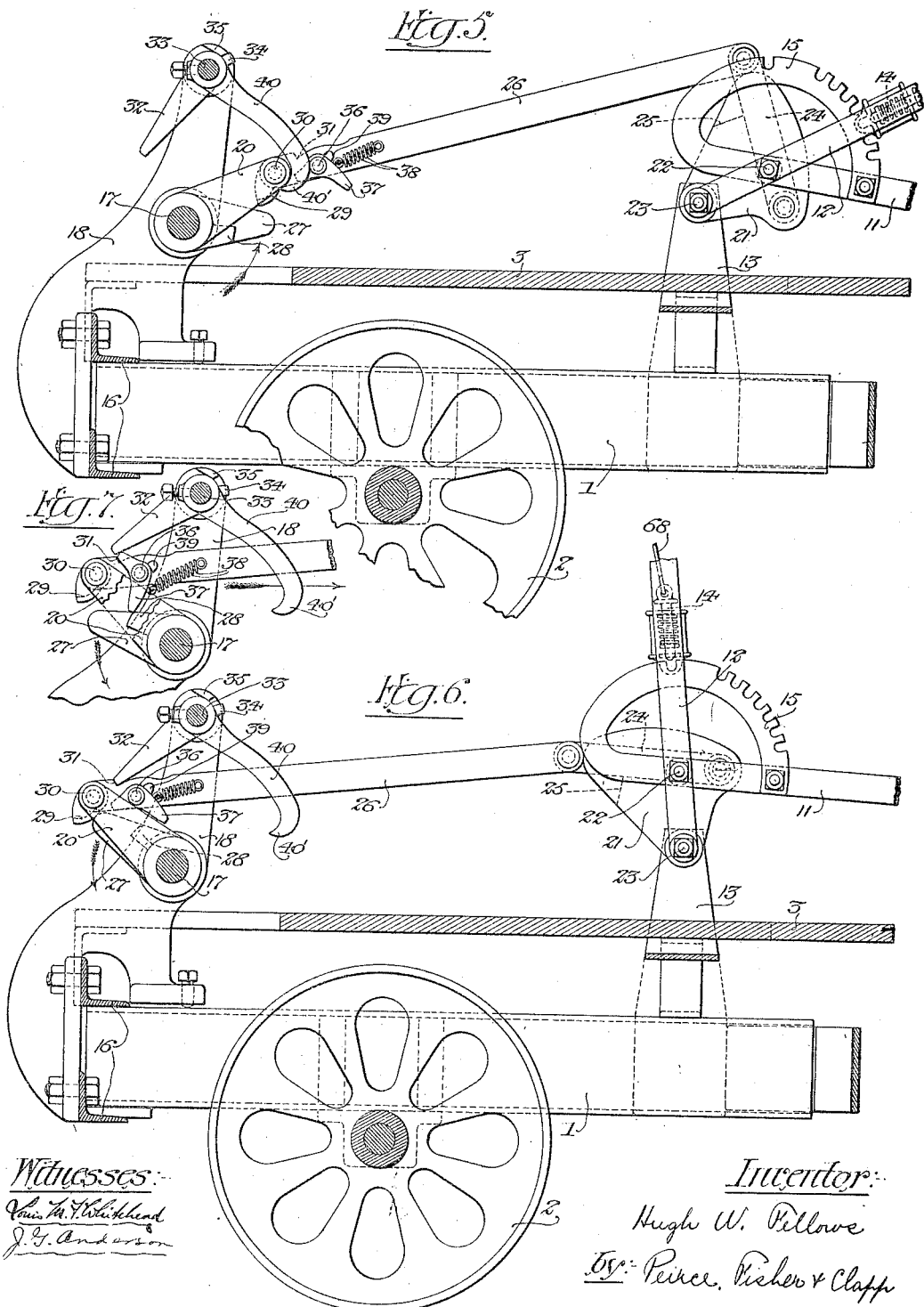

HUGH W. FELLOWS, OF LOS ANGELES, CALIFORNIA, ASSIGNOR TO J. I. CASE THRESHING MACHINE COMPANY, OF RACINE, WISCONSIN, A CORPORATION.

LIFT MECHANISM FOR GANG-PLOWS.

1,319,466.            Specification of Letters Patent.            Patented Oct. 21, 1919.

Application filed May 27, 1914. Serial No. 841,201.

*To all whom it may concern:*

Be it known that I, HUGH W. FELLOWS, a citizen of the United States, and a resident of Los Angeles, county of Los Angeles, and State of California, have invented certain new and useful Improvements in Lift Mechanism for Gang-Plows, of which I do declare the following to be a full, clear, and exact description, reference being had to the accompanying drawings, forming a part of this specification.

The object of the present invention is to provide simple and effective means by which the plows may be successively raised and lowered, and the invention consists in the features of novelty hereinafter described, illustrated in the accompanying drawings and particularly pointed out in the claims at the end of this specification.

Figure 1 is a plan view of a gang plow having my invention applied thereto. Fig. 2 is a view in side elevation showing one of the plows and the lift mechanism therefor. Fig. 3 is a partial front elevation, on an enlarged scale, (parts being shown in vertical section on the line 3—3 of Fig. 1). Fig. 4 is a view in vertical section on the line 4—4 of Fig. 1. Fig. 5 is a view, partly in section and partly in elevation, on line 5—5 of Figs. 1 and 3. Fig. 6 is a view similar to Fig. 5 but showing parts in different position. Fig. 7 is a detail view of the mechanism at the left-hand end of Figs. 5 and 6.

The gang plow illustrated comprises a draft frame 1 supported upon a series of wheels 2 and surmounted by a platform 3. The plow beams 4 carry the plow bodies 5 and are connected at their forward ends by suitable couplings 6, so that the plows may be raised and lowered. Each plow is provided with a gage wheel 7 mounted upon the lower end of an arm 8. The upper end of the gage wheel arm 8 is pivotally mounted on the bracket 9 secured to the plow beam and is provided with a downwardly and forwardly projecting arm 10. Links 11 are pivoted at their rear ends to the arms 10 and are pivoted at their forward ends to a series of shift levers 12. The latter are pivotally mounted at their lower ends upon standards 13 which rise from the draft frame. Each lever is provided, as usual, with a locking dog 14 which coöperates with a notched segment 15 formed upon the forward end of the link 11. The parts thus far described may be of any usual or suitable construction.

The longitudinal members of the draft frame 1 in the construction shown are connected at their forward ends by angle bars 16. The lift mechanism is mounted on a transverse shaft 17 which is journaled at its ends in brackets 18 mounted on the side sills and front angle bars of the frame. As thus far described, the gang plow embodies the construction set forth in an application filed by me in the United States Patent Office January 24, 1914, Serial No. 814,220.

A series of shifter arms 20 are loosely mounted upon the main shaft 17 and these shifter arms are connected to the individual plows of the gang. In the construction shown, a triangular plate 21 is secured to the lower end of each shaft lever 12 by means of bolts 22 and 23. These bolts rigidly secure the plate 21 to the lever, but the bolt 22 also forms the pivotal connection between the lever and the link 11, and the bolt 23 forms the pivotal connection between the lever and the standard 13. A short link 24 is pivoted at its rear end to one side of the plate 21 and its forward end engages a laterally projecting lug 25 on the opposite side of the plate. A second link 26 pivotally connects the rear end of the short link 24 to the upper end of the corresponding shifter arm 20. By moving the shifter arm 20 from the position shown in Figs. 2 and 5, forwardly to the position shown in Fig. 6, the plows are raised through the medium of the connection described, and by moving the shifter arms rearwardly from the position shown in Fig. 6 to that shown in Figs. 2 and 5, the plows are lowered by gravity to working position. The jointed connections between the shifter arms 20 and the hand levers 12 formed by the links 24 and 26 is such that, when the plows are lowered, the hand levers may be used to raise and lower the plows independently of the power actuated mechanism that controls the movement of the shift levers 20.

The shifter arms 20, of course, correspond in number to the number of plows in the gang, and fixed to the main shaft 17 is a series of actuating arms 27. Preferably formed integral with the hubs of these arms 27 are releasing arms 28 projecting laterally therefrom. Each of the actuating arms 27 is adapted to contact with a projection or rounded lug 29 on the forward end of a corresponding link 26, this projection 29 extending forwardly and downwardly somewhat from the pivot connection 30 of the link with the corresponding shifter arm 20. The actuating arms 27 correspond in number to the shifter arms 20 and are arranged progressively in angular spaced relation upon the shaft 17 so that the several plows of the gangs may be successively raised and lowered. By reference more particularly to Figs. 5 to 7 of the drawings, it will be seen that when revolution is imparted to the main shaft 17 in the direction of the arrow there shown, the free end of the actuating arm 27 will contact with the projection 29 on the forward end of the link 26 and will cause this link to be shifted vertically and forwardly, as shown in Fig. 6, and this vertical and forward movement of the link 26 will cause a corresponding shift of the segment plate 21 and through the medium of the link 11, will cause the lifting of the corresponding plow from the ground.

Adjacent its forward end, each of the links 26 is formed upon its upper edge with a notch or shoulder 31 adapted to be engaged by a check-pawl 32 that is pivotally mounted upon a rod 33 that extends from side to side of the machine, this rod being fixed in position upon the upward extensions of the brackets 18. The check-pawl 32 is held by gravity in the position shown in Fig. 5 with a lug 34 on its inner end in engagement with a lug 35 on the adjacent bracket 18. Upon the side of each of the links 26 adjacent its forward end is pivotally mounted, as at 36, a trip 37 that is held, by a spring 38, normally retracted against a stop 39 projecting from the side of the link 26. When the link 26 is moved from the position shown in Fig. 5 to the position shown in Fig. 6 by the rotation of the main shaft 17 and the actuating arm 27 corresponding to the link 26, the free end of the pawl or dog 32 will engage the shoulder 31 of the link 26, so that as the actuating arm 27, in the continued rotation of the shaft 17, passes from engagement with the extension 29 at the forward end of the link 26, the pawl or dog 32 will hold the plow in raised position. The plow will thus be held in raised position shown in Fig. 6 until the main shaft 17 is caused to make another revolution, at which time the releasing arm 28 will contact with the inner end of the pivoted trip or trigger 37 and cause the forward end of this trip to lift the pawl or dog 32 out of engagement with the shoulder 31 on the link 26, as shown in Fig. 7. The weight of the raised plow will then shift the link 26 and parts connected thereto from the position shown in Fig. 6 to the position shown in Fig. 5 as the plow descends to the ground. To the rod 33 is fixed a series of stops 40 having hooked lower ends 40' adapted to engage the ends of the shifter arms 20 and limit the backward movement of said arms, as the plows are lowered. It will be understood, of course, that inasmuch as the actuating arms 27 are disposed at different angles or in staggered relation upon the shaft 17, the raising and lowering of the plows will occur in succession.

In order to impart to the main shaft 17 the rotary movements necessary to effect the automatic raising and lowering of the plows, I employ the mechanism next to be described: Upon the shaft 17 is loosely mounted a cup-shaped or chambered sprocket wheel 41 around which passes a sprocket chain 42 that also passes around a sprocket wheel 43 preferably formed on the hub of a driving ground wheel 44. This ground wheel 44 is shown as mounted upon a short shaft 45 that is journaled in arms or links 46, the upper ends of which are hung upon the shaft 17. The inner end of the short shaft 45 preferably projects through a bracket plate 47 that is formed with a segmental slot 48 to guide the shaft 45. Upon the shaft 45 is loosely mounted a projecting arm 49 which is connected by a link 50 to one end of a spring 51, the opposite end of this spring being adjustably connected by a bolt 52 to an arm 53 depending from the front end of the machine. The spring 51 serves to draw forwardly the driving wheel 44 and better maintain it in contact with the surface of the ground.

Upon the inner side of the sprocket wheel 41 (see Figs. 3 and 4) and preferably formed integral with the hub of this wheel, is a ratchet wheel 54, and fixed to the shaft 17 adjacent the ratchet wheel is a pawl-carrying arm 55 in the free end of which is pivotally mounted a short shaft 56. Upon one end of this short shaft is fixed a pawl 57 adapted to engage the teeth of the ratchet wheel 54, and the pawl is forced normally toward the ratchet wheel by means of a spring 58 that bears upon the pawl adjacent its free end. To the inner end of the short shaft 56 is fixed a throw-out finger 59, the free end of which finger is adapted to be engaged by a shoulder 60 formed on the lower end of a trip arm 61 that is loosely mounted on the shaft 17 between the pawl-carrying arm 55 and a collar 62 fixed to the shaft 17 (see Fig. 3). The lower end of the trip arm 61 is offset, as shown in Figs. 3 and 4, and to the offset portion of this trip arm is attached a link or cord 63 that will extend forwardly therefrom to the traction engine which pulls the plow.

From the foregoing description it will be seen that so long as the trip arm 61 is in the normal position shown in Fig. 4, the throw-out finger 59 will rest upon the shoulder 60 of the trip arm and will prevent the engagement of the pawl 57 with the ratchet wheel 54, and hence the shaft 17 will remain idle. If, however, the operator, by pulling the cord or link 63 in the direction of the arrow, Fig. 4, moves the trip arm 61 until it is disengaged from the throw-out finger 59, the spring 58 will force the pawl 57 into engagement with the ratchet wheel 54, and as this ratchet wheel is constantly driven, rotation will thus be imparted to the main shaft 17. If the plows be in lowered position at the time the trip arm 61 is thus shifted by the cord or link 63, each of the shifter arms 27, and parts connecting such arms with the plows, will be in the relative positions shown in Fig. 5 of the drawing and the rotation of the shaft 17 will cause each of the actuating arms 27 to be turned in the direction of the arrow, Fig. 5, and shift the links 26 and parts connected therewith from the position shown in Fig. 6, as hereinbefore described. When the shaft 17 has made a complete revolution, the throw-out finger 59 will again be engaged with the shoulder 60 on the trip arm 61 and will shift the pawl out of engagement with the ratchet wheel 54 so that further revolution of the shaft 17 is arrested and the plows will remain in lifted position until the operator again actuates the trip arm 61. On the other hand, if the parts be in the position shown in Fig. 6 (at which time the plows will be raised from the ground) and it is desired to lower the plows, the operator will shift the trip arm 61, as above described, and rotation being imparted to the shaft 17 from the sprocket wheel 41 will cause the releasing arms 28 to engage the trip or triggers 37 so that the dogs or pawls 32 will be disengaged from the links 26 and the plows will be permitted to descend to the ground, as hereinbefore set forth. In its normal position, the lower offset end of the trip arm 61 engages a spring-held stop plunger 64 mounted on an offset portion 65 of the adjacent bracket 18, and this yielding stop cushions the throw-out action of the trip arm.

It will be understood, of course, that the manual shifting of the plows can be affected by means of the hand levers 12 and connected parts, as set forth in my hereinbefore mentioned application Serial No. 814,220, filed January 24, 1914. When the power lift is in use, the latches 66 are engaged with the trips 67 that are connected to the dogs by links 68, so that the dogs will be held out of engagement with the segments 15.

It is obvious that numerous changes may be made in the details above set forth without departing from the essentials of the invention and that features of the invention may be employed without its adoption as an entirety.

Having thus described my invention, what I claim as new and desire to secure by Letters Patent is—

1. In a power lift for plows, the combination with a plow, of means for raising said plow comprising a shifter arm, connections between said shifter arm and the plow including a link pivotally connected to said shifter arm and provided at its forward end with a projecting part, an operating shaft whereon said shifter arm is pivotally mounted, an actuating arm fixed to said shaft and adapted, during a portion of its revolution, to engage said projecting part at the forward end of said link, a shoulder adjacent the forward end of said link, a dog adapted to engage said shoulder and check the reverse movement of said shifter arm and parts connected therewith, a trip pivoted upon said link adjacent said shoulder, and a part actuated by said operating shaft for engaging said trip to release said dog.

2. In power lifts for gang plows, the combination with a series of plows, of a series of shifter arms connected to said plows, an operating shaft whereon said shifter arms are mounted, a series of actuating arms rigidly mounted on said shaft, projections connected to said shifter arms and extending into the paths of travel of said actuating arms during a portion of their revolution, dogs for checking the reverse movement of said shifter arms and parts connected therewith, a series of fixed stops for arresting the reverse movement of the shifter arms and parts connected thereto, and a series of releasing arms mounted upon said shaft for automatically releasing said dogs.

3. In power lifts for gang plows, the combination with a series of plows, of a series of shifter arms connected to said plows, an operating shaft whereon said shifter arms are pivotally mounted, said shifter arms extending upwardly from said shaft, a series of actuating arms rigidly mounted on said shaft, projections connected to said shifter arms and extending into the paths of travel of said actuating arms during a portion of their revolution, pivoted dogs arranged above said shifter arms for checking the reverse movement of said arms and the parts connected therewith, a series of trip arms movable with said shifter arms and parts connected therewith for releasing said dogs, a series of releasing arms rigidly mounted on said operating shaft for engaging said trip arms to release said dogs, and a series of stops for checking the backward movement of said shifter arms and parts connected therewith after said dogs have been released.

HUGH W. FELLOWS.

Witnesses:
GEO. F. FISHER,
J. G. ANDERSON.